(No Model.) 2 Sheets—Sheet 1.

W. MACKINTOSH.
CONDUIT FOR UNDERGROUND ELECTRIC CONDUCTORS.

No. 266,171. Patented Oct. 17, 1882.

WITNESSES
W<sup>m</sup> A. Skinkle
K. Lockwood French

INVENTOR
William Mackintosh
By his Attorney
Frank L. Pope (No Model.) 2 Sheets—Sheet 2.
W. MACKINTOSH.
CONDUIT FOR UNDERGROUND ELECTRIC CONDUCTORS.
No. 266,171. Patented Oct. 17, 1882.
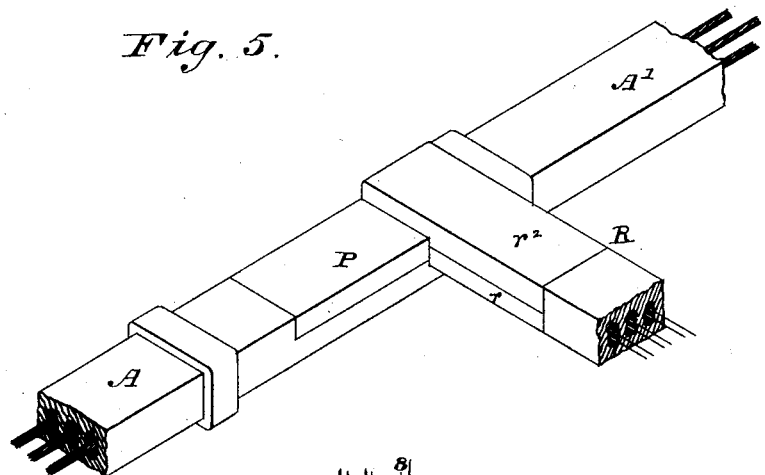
Fig. 5.
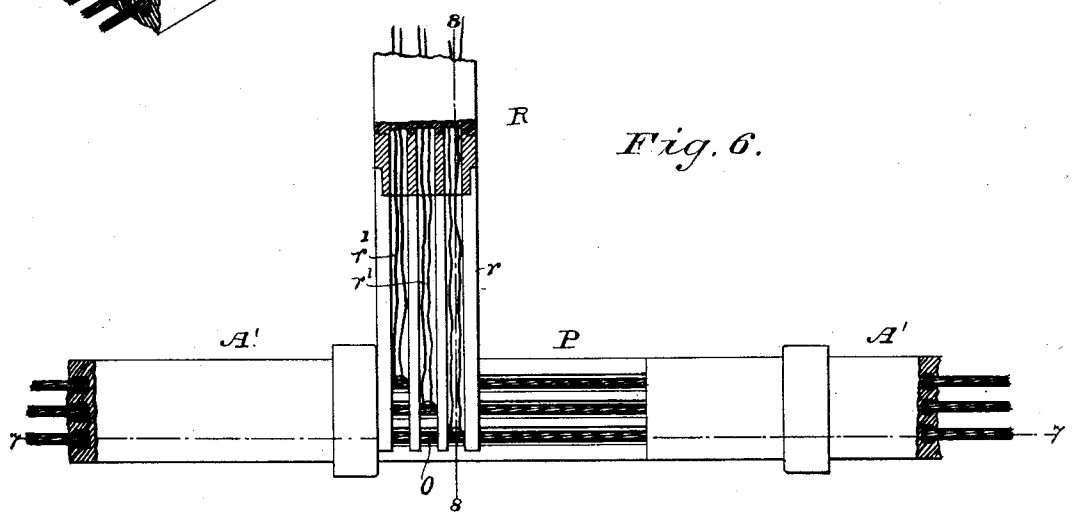
Fig. 6.
Fig. 7.
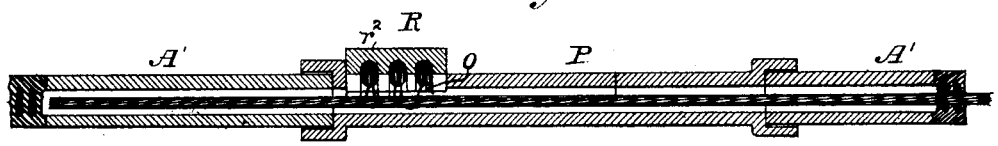
Fig. 8.
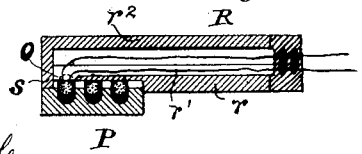
WITNESSES
Wm A. Skinkle
K. Lockwood French
INVENTOR
William Mackintosh.
By his Attorney
Frank L. Pope
N. PETERS, Photo-Lithographer, Washington, D. C.

UNITED STATES PATENT OFFICE.

WILLIAM MACKINTOSH, OF PROVIDENCE, RHODE ISLAND.

CONDUIT FOR UNDERGROUND ELECTRIC CONDUCTORS.

SPECIFICATION forming part of Letters Patent No. 266,171, dated October 17, 1882.

Application filed April 24, 1882. (No model.)

*To all whom it may concern:*

Be it known that I, WILLIAM MACKINTOSH, a citizen of the United States, residing in Providence, in the county of Providence and State of Rhode Island, have invented a new and useful Improvement in Conduits for Underground Electric Conductors, of which the following is a specification.

My invention relates to certain improvements in the construction of conduits for subterranean electric conductors.

The object of the invention is to provide convenient means for obtaining access to the conductors for the purpose of withdrawing and renewing the same and for uniting conduits for branch conductors thereto.

My invention consists in constructing a conduit with one or more longitudinal chambers for containing one or more series of electrical conductors, with intermediate sections placed at convenient points in the line of the main conduit constituting a part thereof, but so constructed as to be capable of being opened when desired for the purpose of giving access to the interior chambers, and also in providing detachable sections which normally serve as a section of the main conduit, but which may be removed and replaced by other sections provided with means for coupling therewith branch conduits for containing branch conductors.

Figure 1:
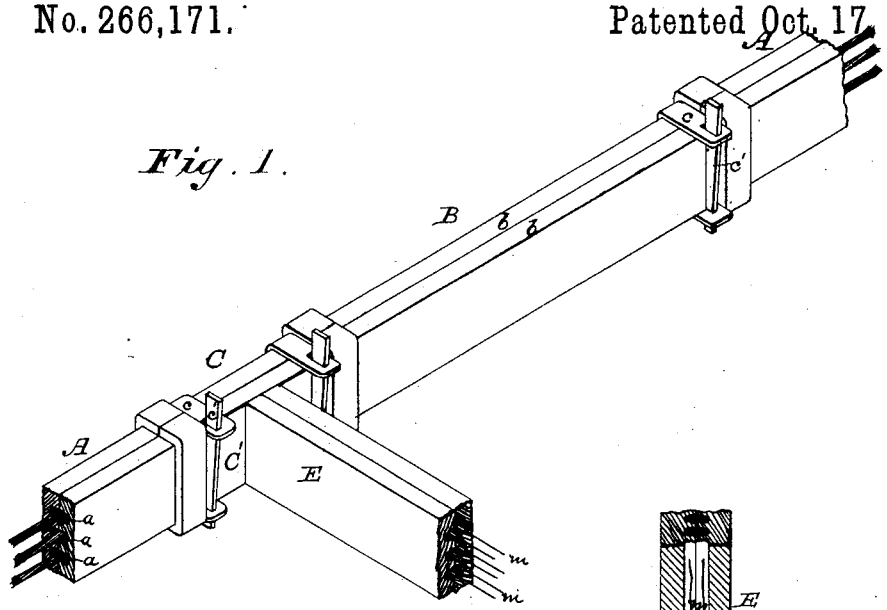
Figure 2:
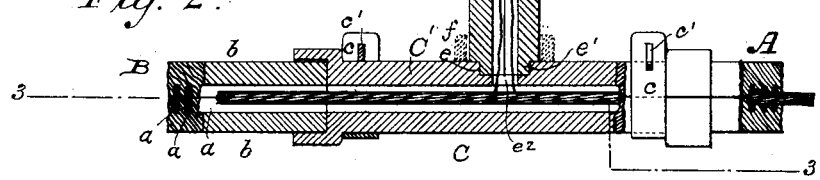
Figure 3:
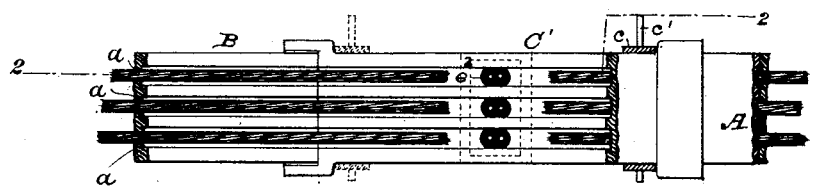
Figure 4:
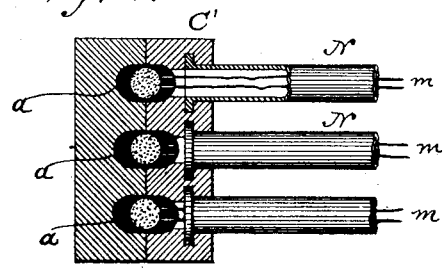

In the acccompanying drawings, which illustrate my invention, Figures 1 and 5 are perspective views, showing two forms of multiple conduits with branch conduits united therewith. Figs. 2 and 3 are sectional views, showing the internal constructions of the conduits represented in Fig. 1, Fig. 2 being a section through the line 2 2 of Fig. 3, and Fig. 3 showing a section through the line 3 3 of Fig. 2. Fig. 4 represents a modification in the method of jointing the branch conduits. Figs. 6, 7, and 8 are sectional views of the conduit represented in Fig. 5, of which Fig. 7 shows a section through the line 7 7 of Fig. 8, and Fig. 8 shows a section through the line 8 8 of Fig. 7.

Referring to Figs. 1, 2, and 3, A represents a conduit, which may be constructed of any suitable material, preferably a non-conducting material—such as terra-cotta or other form of earthenware — through the whole length of which extend any desirable number of separate chambers, *a*, for containing the electric conductors. The main conduit is constructed in lengths or sections of any convenient dimensions, which sections are united at their ends by means of the ordinary bell or socket joint, or by coupling-bands, or by any other suitable means. Each length of the conduit is preferably constructed in one piece, with the longitudinal perforations or chambers extending therethrough; or they may be constructed in halves, each half being provided with longitudinal semicircular grooves corresponding in position with the other, these being afterward bound together and the joint securely closed by cement or otherwise.

At convenient distances along the length of the conduit are interposed special sections B, similar in general construction to the main conduit, but longitudinally divided and so constructed that either half *b* may be removed at pleasure, thus giving access to the interior chambers, *a*, for withdrawing or renewing the conductors. The two longitudinal sections are normally held together by bands or by a clamp, consisting of a strap and key, as shown at *c* and *c'*, and jointed to the adjacent sections in the same general manner that the separate lengths are connected with each other. Besides the sections B, there are also placed at requisite distances, and preferably adjacent to the sections B, other longitudinally-divided sections, C, similar in general construction to the sections B. The purpose of the divided sections C is to allow branch conductors to be led off from the main conductors or cables in the main conduit. This is accomplished by making one or both of the sections or halves of the lengths C detachable, in order that it may be entirely removed and replaced by a section, C'. This section may be constructed with a mortise, *e*, Fig. 2, for receiving a tenon, *e'*, formed at the end of a length of the branch conduit E, which is, in other respects, similar to the main conduit A. From the bottom of the mortise *e* separate perforations *e²* lead through into the respective chambers of the main conduit A, and through these perforations the required conductors are led to the corresponding chambers in the branch pipes, as desired.

In the figures I have represented the main conduit as supplied with three chambers, each containing a separate bundle or cable of conductors, one of which may be devoted to conductors employed for electric lighting and the others for telegraphic and telephonic purposes respectively. From the cable are led off any desired number of branch conductors, $m$ $m$, at any point along the main conduit, passing from thence into the branch conduit.

Instead of employing a mortise-and-tenon joint for uniting the branch conduits, a suitable bell or socket, $f$, of sufficient size to receive the end of the branch may be placed upon the side of the main conduit and the branch conduit fitted therein.

A modification in the method of uniting the branch conduits is shown in Fig. 4, where single branch conduits are employed in lieu of the multiple conduits before described. This plan consists in embedding within one section of the removable length one or more short iron pipes, N, preferably coated on their inner surface with porcelain or other non-conducting material, to the end of any one of which a single conduit may be attached for conducting telegraph, telephone, or electric-light wires, as may be required, to any neighboring point.

In the above description I have shown my invention as applied to a multiple conduit wherein the separate chambers are placed one above the other. In some instances it is found desirable to place the different groups of conductors parallel with each other and in the same horizontal plane.

In Figs. 5, 6, 7, and 8 I have illustrated the manner of applying branch conduits to a multiple conduit having its chambers in a horizontal plane. In these drawings, A′ represents a multiple conduit of the same general construction as that described with reference to Fig. 1, but placed horizontally instead of vertically. At suitable distances apart are placed removable sections P, which are normally held in position by any of the means described with reference to Fig. 1. Adjacent to the removable sections, and at right angles thereto, are placed the terminals R of the branch conduits. These terminals consist of a lower section, $r$, provided with longitudinal semicircular grooves $r'$ $r'$, each of which is cut away at the end resting upon the lower section of the main conduit, so as to open into one of the chambers of the latter, as shown at O in Figs. 6, 7, and 8. The upper section, $r^2$, of the terminal R consists simply of a half-section of conduit, provided with grooves corresponding to those in the section $r$, and also provided with a flange or projection, $s$, extending downward over the end to a sufficient distance to close the end of both sections of the branch conduit or terminal. The method of leading off the wires from the main conduit through the branch chambers is similar to that described with reference to Figs. 1, 2, and 3.

In practice it may be found desirable to coat the interior surfaces of the chambers with some material impervious to moisture, such as porcelain or bituminous cement.

The various joints between the lengths of conduit and removable sections may be made water-tight by the use of cement or by any other suitable means.

It is my purpose in practice to place the detachable sections along the length of the conduit at any point where it may be required at some subsequent time to lead off any of the conductors—for example, at the corners of each block in a city or in front of stores or houses where it may be required to employ electricity for lighting or for telegraphic or telephonic communication.

If it is not desired to unite the branch conductors at the time of laying the main conduit, the short removable sections are inserted and replaced by the branch sections when desired.

What I claim as my invention is—

The combination, substantially as hereinbefore set forth, of a main conduit constructed with multiple chambers for containing electric conductors, removable sections interposed at requisite intervals along the length of said main conduit and consisting of short lengths of conduit having the same internal construction as the main conduit, interchangeable sections for replacing the removable sections, and branch conduits having chambers for containing electric conductors corresponding to those of the main conduit, the said interchangeable sections and branch conduits being also constructed as described, whereby the two may be united so as to connect the chambers of the branch conduit with the corresponding chambers with the main conduit.

WM. MACKINTOSH.

Witnesses:
CHARLES A. TERRY,
MILLER C. EARL.